United States Patent
Yadav et al.

(10) Patent No.: US 11,676,062 B2
(45) Date of Patent: Jun. 13, 2023

(54) DYNAMICALLY EVOLVING HYBRID PERSONALIZED ARTIFICIAL INTELLIGENCE SYSTEM

(71) Applicant: Samsung Electronics Co., Ltd, Suwon-si (KR)

(72) Inventors: Anil Sunder Yadav, Cupertino, CA (US); Gurmeet Singh, Mountain View, CA (US); Divya Neelagiri, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1074 days.

(21) Appl. No.: 16/293,523

(22) Filed: Mar. 5, 2019

(65) Prior Publication Data

US 2019/0279106 A1 Sep. 12, 2019

Related U.S. Application Data

(60) Provisional application No. 62/639,174, filed on Mar. 6, 2018.

(51) Int. Cl.
*G10L 15/18* (2013.01)
*G10L 15/22* (2006.01)
(Continued)

(52) U.S. Cl.
CPC ............... *G06N 20/00* (2019.01); *G06N 5/02* (2013.01); *G06N 5/04* (2013.01); *G10L 15/1815* (2013.01);
(Continued)

(58) Field of Classification Search
CPC ..... G10L 15/1815; G10L 15/22; G10L 15/32; G10L 2015/223; G06N 20/00; G06N 5/02; G06N 5/04
See application file for complete search history.

(56) References Cited

U.S. PATENT DOCUMENTS

| | | | |
|---|---|---|---|
| 7,031,915 B2 | 4/2006 | Baker | |
| 8,315,878 B1 * | 11/2012 | Burns | ..................... G06F 3/167 |
| | | | 704/270.1 |

(Continued)

FOREIGN PATENT DOCUMENTS

| | | | | |
|---|---|---|---|---|
| CA | 2761839 A1 * | 9/2012 | ............. | G10L 15/22 |
| CA | 2839285 A1 * | 12/2012 | ......... | G01C 21/3608 |

(Continued)

OTHER PUBLICATIONS

International Search Report dated Jun. 11, 2019 in connection with International Patent Application No. PCT/KR2019/002616, 3 pages.
(Continued)

*Primary Examiner* — Daniel C Washburn
*Assistant Examiner* — Oluwadamilola M Ogunbiyi

(57) ABSTRACT

A method, an electronic device, and non-transitory machine-readable medium are provided. The method includes receiving, on an electronic device, a request to perform an action. The method also includes deriving an aggregated predicted confidence level using one or more confidence levels. The one or more confidence levels are based on usage information and context of the electronic device. The method further includes determining an execution engine to process the request based on the aggregated predicted confidence level. The method additionally includes providing at least a portion of the request to the execution engine for processing.

20 Claims, 8 Drawing Sheets

(51) Int. Cl.
  *G10L 15/32* (2013.01)
  *G06N 5/02* (2023.01)
  *G06N 5/04* (2023.01)
  *G06N 20/00* (2019.01)
(52) U.S. Cl.
  CPC .............. *G10L 15/22* (2013.01); *G10L 15/32* (2013.01); *G10L 2015/223* (2013.01)

(56) References Cited

U.S. PATENT DOCUMENTS

| | | | |
|---|---|---|---|
| 8,942,979 | B2 | 1/2015 | Kim et al. |
| 8,983,845 | B1* | 3/2015 | Kristjansson ....... H04L 41/0803 704/270.1 |
| 9,679,568 | B1* | 6/2017 | Taubman ............ G06F 16/9535 |
| 9,721,386 | B1 | 8/2017 | Worley, III et al. |
| 9,892,733 | B2* | 2/2018 | Yassa ...................... G10L 15/26 |
| 10,847,160 | B2* | 11/2020 | Gruenstein ............. G10L 15/30 |
| 11,348,580 | B2* | 5/2022 | Bhat ...................... H04R 25/558 |
| 2008/0243828 | A1* | 10/2008 | Reztlaff .............. G06F 16/3331 707/999.005 |
| 2010/0151825 | A1* | 6/2010 | Millet Sancho ....... G08C 17/02 455/411 |
| 2010/0241646 | A1 | 9/2010 | Friedman et al. |
| 2010/0250243 | A1* | 9/2010 | Schalk ..................... G06F 3/167 704/235 |
| 2011/0161077 | A1* | 6/2011 | Bielby .................... G10L 15/32 704/E15.001 |
| 2011/0258223 | A1 | 10/2011 | Lim et al. |
| 2012/0232886 | A1* | 9/2012 | Capuozzo ........... H04L 12/2818 704/9 |
| 2013/0138440 | A1 | 5/2013 | Strope et al. |
| 2013/0144595 | A1* | 6/2013 | Lord ........................ G06F 40/58 704/2 |
| 2014/0122075 | A1 | 5/2014 | Bak et al. |
| 2014/0163749 | A1* | 6/2014 | Phillips .............. G05B 19/0428 700/283 |
| 2014/0358539 | A1* | 12/2014 | Rao ....................... G10L 15/063 704/243 |
| 2014/0365200 | A1* | 12/2014 | Sagie ...................... G06F 40/51 704/2 |
| 2015/0000616 | A1 | 1/2015 | Yamashiro et al. |
| 2015/0006166 | A1 | 1/2015 | Schmidt |
| 2015/0120296 | A1 | 4/2015 | Stern et al. |
| 2017/0075646 | A1* | 3/2017 | Bostick ................ H04W 64/003 |
| 2017/0160813 | A1* | 6/2017 | Divakaran ............. G06N 5/022 |
| 2017/0177710 | A1 | 6/2017 | Burlik |
| 2017/0263248 | A1* | 9/2017 | Gruber .................. G06F 40/232 |
| 2017/0263249 | A1* | 9/2017 | Akbacak ............... G06F 40/166 |
| 2018/0024917 | A1* | 1/2018 | Young .................. G06F 11/3688 717/130 |
| 2018/0025731 | A1* | 1/2018 | Lovitt ..................... G10L 15/22 704/255 |
| 2018/0053507 | A1* | 2/2018 | Wang ..................... G10L 15/18 |
| 2018/0096678 | A1* | 4/2018 | Zhou ...................... G10L 15/22 |
| 2018/0137857 | A1* | 5/2018 | Zhou ...................... G10L 15/02 |
| 2018/0270576 | A1* | 9/2018 | Chua ..................... H04L 12/282 |
| 2018/0332118 | A1* | 11/2018 | Phipps ................ H04L 67/1095 |
| 2019/0138957 | A1* | 5/2019 | Kane ...................... H04L 41/22 |
| 2020/0120396 | A1* | 4/2020 | Jamal ................. H04N 21/4825 |

FOREIGN PATENT DOCUMENTS

| | | | | |
|---|---|---|---|---|
| CN | 107369447 A | * | 11/2017 | |
| CN | 107919117 A | | 4/2018 | |
| DE | 202017104019 U1 | * | 11/2017 | ....... G06F 16/24575 |
| JP | 2017-90612 A | | 5/2017 | |
| KR | 10-2013-0021136 A | | 3/2013 | |
| KR | 10-1657655 B1 | | 9/2016 | |
| WO | 2016/054230 A1 | | 4/2016 | |
| WO | WO-2017044257 A1 | * | 3/2017 | ......... G06F 16/3329 |
| WO | 2017/197018 A2 | | 11/2017 | |
| WO | WO-2017213681 A1 | * | 12/2017 | ........... G06F 17/279 |
| WO | WO-2018213617 A1 | * | 11/2018 | ......... G05B 23/0243 |

OTHER PUBLICATIONS

Written Opinion of the International Searching Authority dated Jun. 11, 2019 in connection with International Patent Application No. PCT/KR2019/002616, 5 pages.

Supplementary European Search Report dated Feb. 23, 2021 in connection with European Patent Application No. 19 76 4829, 11 pages.

Summons to attend oral proceedings pursuant to Rule 115(1) EPC dated Jan. 24, 2023 in connection with European Patent Application No. 19764829.8, 9 pages.

* cited by examiner

DYNAMICALLY EVOLVING HYBRID PERSONALIZED ARTIFICIAL INTELLIGENCE SYSTEM

CROSS-REFERENCE TO RELATED APPLICATION AND CLAIM OF PRIORITY

This application claims priority under 35 U.S.C. § 119(e) to U.S. Provisional Patent Application No. 62/639,174 filed on Mar. 6, 2018. The above-identified provisional patent application is hereby incorporated by reference in its entirety.

TECHNICAL FIELD

This disclosure relates generally to electronic devices. More specifically, this disclosure relates to a personalized hybrid decision engine.

BACKGROUND

Methods for interacting with and controlling computing devices are continually improving in order to create more natural interfaces. Many such methods for interacting with and controlling computing devices generally require users to utilize user interface instruments, such as a keyboard, mouse, or touchscreen. Some electronic devices are adapted to perform automatic speech recognition, natural language processing, and action planning and execution that enable users to interact with computing devices via a natural language input. For example, a natural language input can include a voice enabled user interface in which a user is able to interact with the computing device through spoken or typed text. Thereafter, the electronic device is able to perform the request of the user, such as turning on a light, playing a specific song, turning on an appliance, or the like. Natural language processing is becoming an interaction method of choice for some electronic devices and appliances. An electronic device that is able to interpret the intended meaning of a natural language command and then perform the intended action plays an increasingly important role in consumer satisfaction.

SUMMARY

This disclosure provides dynamically evolving hybrid personalize artificial intelligent system.

In one embodiment, a method includes receiving, on an electronic device, a request to perform an action. The method also includes deriving an aggregated predicted confidence level based on one or more confidence levels associated with information and context of the electronic device. The method further includes determining an execution engine to process the request based on the aggregated predicted confidence level. The method additionally includes providing at least a portion of the request to the execution engine for processing.

In another embodiment, an electronic device includes at least one processor. The at least one processor is configured to receive a request to perform an action with respect to the electronic device. The at least one processor is also configured to derive an aggregated predicted confidence level based on one or more confidence levels associated with information and context of the electronic device. The at least one processor is further configured to determine an execution engine to process the request based on the aggregated predicted confidence level. The at least one processor is additionally configured to provide at least a portion of the request to the execution engine for processing.

In yet another embodiment, a non-transitory computer readable medium embodies a computer program. The computer program includes computer readable program code that, when executed by at least one processor of an electronic device, causes the at least one processor to receive a request to perform an action with respect to the electronic device. The computer program also includes computer readable program code that, when executed, causes the at least one processor to derive an aggregated predicted confidence level based on one or more confidence levels associated with information and context of the electronic device. The computer program further includes computer readable program code that, when executed, causes the at least one processor to determine an execution engine to process the request based on the aggregated predicted confidence level. The computer program additionally includes computer readable program code that, when executed, causes the at least one processor to provide at least a portion of the request to the execution engine for processing.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
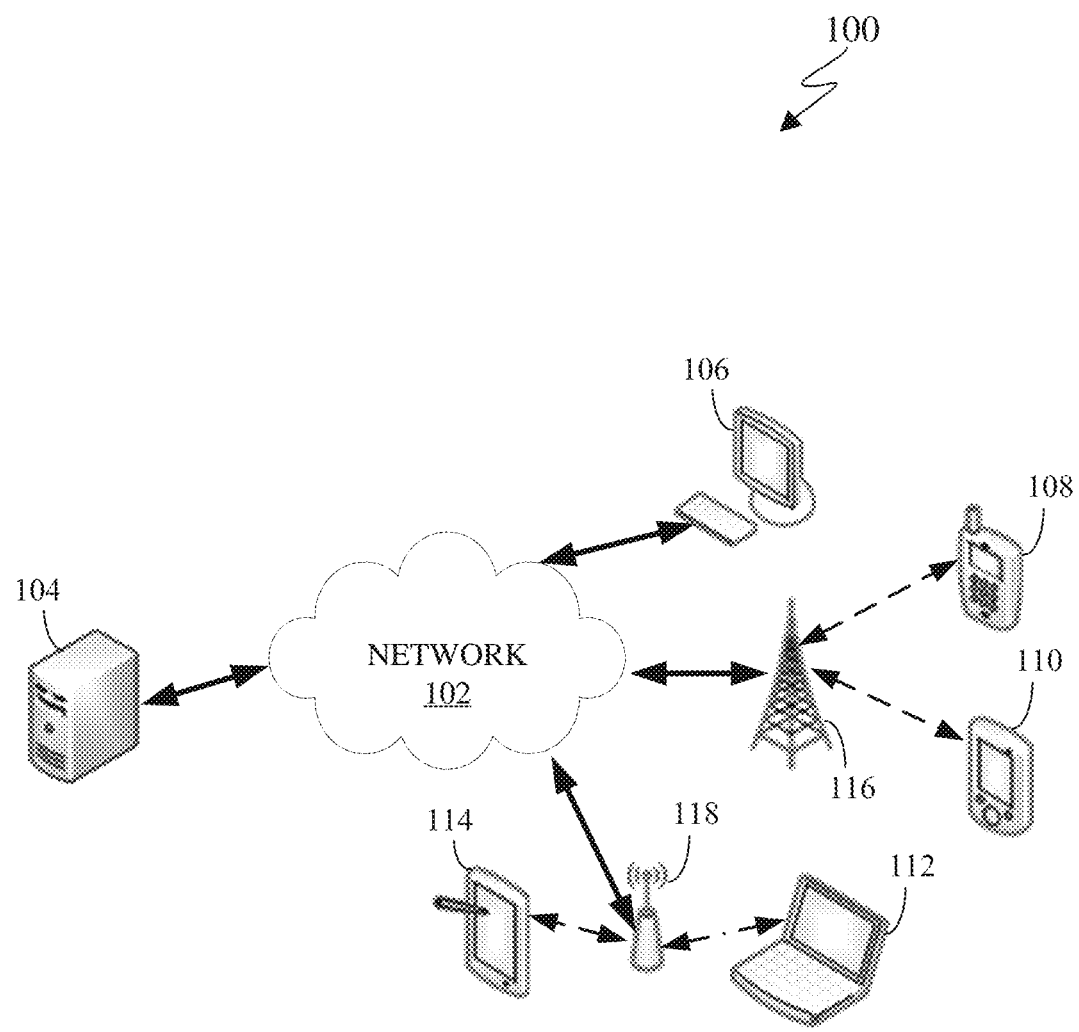
FIG. 1 illustrates an example communication system in accordance with an embodiment of this disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

According to embodiments of this disclosure, various systems and methods for controlling and interacting with computing devices are provided. A graphical user interface enables a user to interact with an electronic device, such as a computing device, by providing an ability for the user to locate and select objects on a screen. Common interactions include physical manipulations, such as the user physically typing on a keyboard, moving a mouse, and touching a touchscreen of a touch-sensitive surface, among others. There are instances, when utilizing various physical interactions, such as touching the touchscreen, are not feasible, such as when the user wears a head-mounted display device or when the electronic device does not include a display. Additionally, instances occur in which utilizing various physical interactions, such as touching a touchscreen or using an accessory (like a keyboard, mouse, touch pad, remote, or the like), is inconvenient or cumbersome.

Embodiments of this disclosure provide for additional approaches to interact with an electronic device, such as using a physical interaction technique that generates or transmits a request to the electronic device. For example, instances in which utilizing various physical interactions, such as typing a request to an electronic device on a keyboard or providing the electronic device a written request may be preferred, where the request includes an action that is to be performed. It should be noted that, as used here, the term "user" may denote a human or another device (such as an artificial intelligent electronic device) using the electronic device.

According to embodiments of this disclosure, the electronic device can include a personal computer (such as a laptop or a desktop), a workstation, a server, a television, an appliance, a virtual assistant, and the like. Additionally, the electronic device can be at least one part of a piece of furniture or building/structure, an electronic board, an electronic signature receiving device, a projector, or a measurement device. In some embodiments, the electronic device can be a portable electronic device or a portable communication device (such as a smartphone or mobile phone), a laptop, a tablet, a global positioning system (GPS) receiver, an electronic book reader (such as an e-reader), a personal digital assistant (PDA), a portable multimedia player (PMP), an MPEG-1 Audio Layer III or MPEG-2 Audio Layer III (MP3) player, a virtual reality headset, a portable game console, a camera, or a wearable device, among others. Additionally, the electronic device can be a medical device (such as a blood sugar measuring device, a heartbeat measuring device, a body temperature measuring device, an imaging device, an ultrasonic device, among others), as well an Internet of Things (IoT) device (such as a light bulb, various sensors, a thermostat, fitness equipment, or the like). The electronic device can be one or a combination of the above-listed devices. Additionally, the electronic device as disclosed herein is not limited to the above-listed devices and can include new electronic devices depending on the development of technology.

According to embodiments of this disclosure, a natural approach to interacting with and controlling a computing device can include a voice-enabled user interface. A voice-enabled user interface enables a user to interact with a computing device through the act of speaking. Speaking can include a human speaking directly to the electronic device, or another electronic device projecting sound through a speaker. Another natural approach to interacting with and controlling a computing device can include providing an electronically typed or printed text, which includes a request to an electronic device, whereby the electronic device reads the request of the user. Once the computing device detects and receives the sound or written request, the computing device can derive contextual meaning from the request and thereafter perform the requested task. Embodiments of this disclosure can include additional methods of interacting with an electronic device, such as the transmission (wired or wirelessly) of a request from one electronic device to another electronic device.

A virtual assistant, a smart assistant, an artificial intelligence (AI) assistant, a smart hub, a voice assistant, and the like (collectively referred to here as virtual assistant devices) are a family of devices that can perform various tasks and services for a user. For example, virtual assistant devices can provide a variety of services, such as providing the weather, setting an alarm, creating and maintaining a shopping list, playing music, turning on a specific appliance or television program, and switching on/off a smart light bulb, to name a few. A virtual assistant device is able to interact with a user through various types of user interfaces including a voice-enabled user interface.

Embodiments of this disclosure recognize and take into consideration that when a virtual assistant device receives an input (such as a request from a user), the virtual assistant device, or another component thereof, processes the request. In certain embodiments, processing the request is performed by an execution engine. One or more execution engines analyze and process the request. Processing the request can include automatic speech recognition (ASR), natural language processing (NLP), and action planning and execution (APE). When a virtual assistant device performs ASR, NLP and APE, the processing can be performed on the device that is utilized by the user or performed remotely, such as on a remote server, or in a cloud based network. If the execution engine associated with the ASR, NLP and APE is located on the on the device itself, considerable processing power can be used to perform each task, and thereby reducing available resources of the electronic device for other programs. Additionally, if the device is powered by a battery, the processing can reduce the battery level of the electronic device. Alternatively, if the execution engine associated with the ASR, NLP, and APE is located remotely the electronic device requires a network connection to request the necessary processing from the remote server, such as access to the internet. Sending each request over a network for processing can reduce consumer satisfaction due to end-to-end latency associated with transmitting the request to the network and receiving the results of the processing, such that a delay occurs between the user imitating the request and the electronic device performing the request.

Therefore, embodiments of the present disclosure provide a hybrid decision engine that chooses between using an execution engine located on the device itself, an execution engine located remotely, or a combination thereof. Additionally, the hybrid engine can be personalized to each user via feedback data, user information, device information, or a combination thereof. Such personalization enables the hybrid engine to create a personalized user experience.

In certain embodiments, an execution engine that performs ASR can identify speech signals from an input. For example, if the input from a user is a verbal request, ASR identifies the speech signal and converts the signals to text. An execution engine that performs NLP can identify the intent from the request of the user. For example, NLP can include one or more language models that enable the virtual assistant device to identify keywords and the domain associated with the request in order to understand a natural language input. An execution engine that performs APE determines how to perform the request of the user and can also generate instructions that instruct the electronic device (or another electronic device) how to perform the request of the user. For example, if the electronic device receives the request "open camera and take a picture," the execution engine for the ASR converts the verbal request to text, the execution engine for the NLP identifies keywords and the domain of the request, and the execution engine for the APE generates and provides instructions to an electronic device. That is, execution engine for the NLP will identify key words such as OPEN, CAMERA, TAKE, PICTURE, and provide the APE with the intent of the user, such as opening the camera application on the electronic device and take a picture. Thereafter the execution engine for the APE generates instructions that instruct the device to turn on and activate the camera application and capture a picture. As used herein, inputs such as a verbal utterance and a typed input can be used interchangeably. Additionally, it should be noted that natural language inputs are not limited to verbal utterances and typed inputs.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head-mounted display (HMD), or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102. In some embodiments, the server 104 includes one or more execution engines used for ASR, NLP, and APE.

Each client device 106-114 represents any suitable computing or processing device that interacts with at least one server (such as the server 104) or other computing device(s) over the network 102. In this example, the client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. As described in more detail below, an electronic device (such as the desktop computer 106, mobile device 108, PDA 110, laptop computer 112, or tablet computer 114) can be a virtual assistant device that receives natural language inputs, such as verbal utterances, from a user and performs the intended actions.

In this example, some client devices 108-114 communicate indirectly with the network 102. For example, the client devices 108 and 110 (mobile device 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In some embodiments, any of the client devices 106-114 transmit information securely and efficiently to another device, such as, for example, the server 104. Also, any of the client devices 106-114 can trigger the information transmission between itself and server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
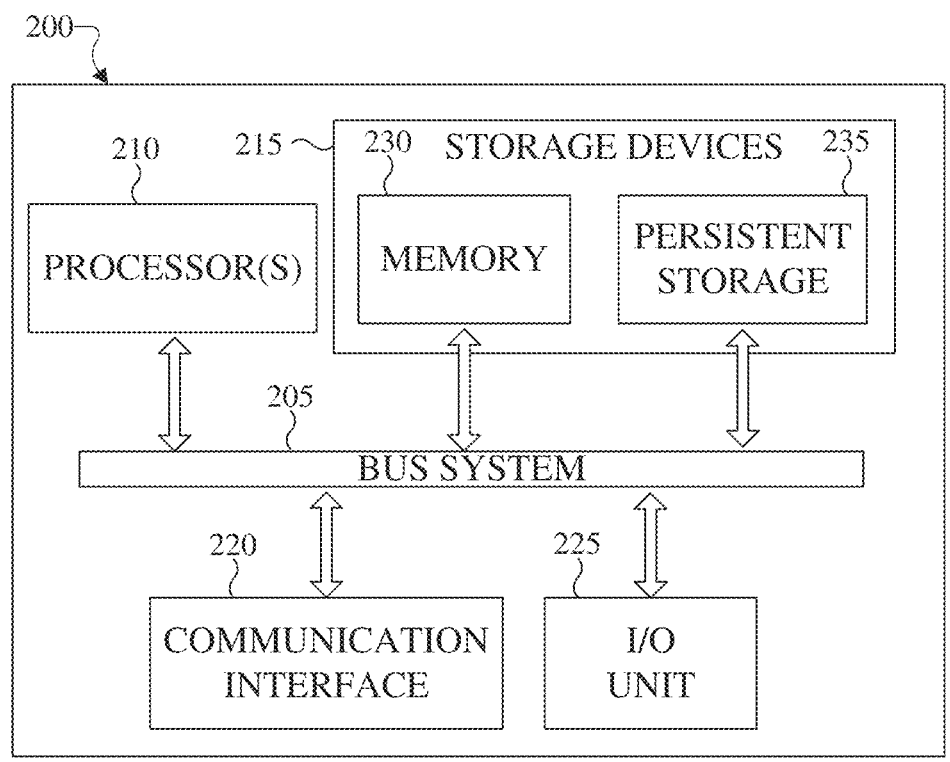
FIG. 2 illustrates an example electronic device in accordance with an embodiment of this disclosure.
Figure 3:
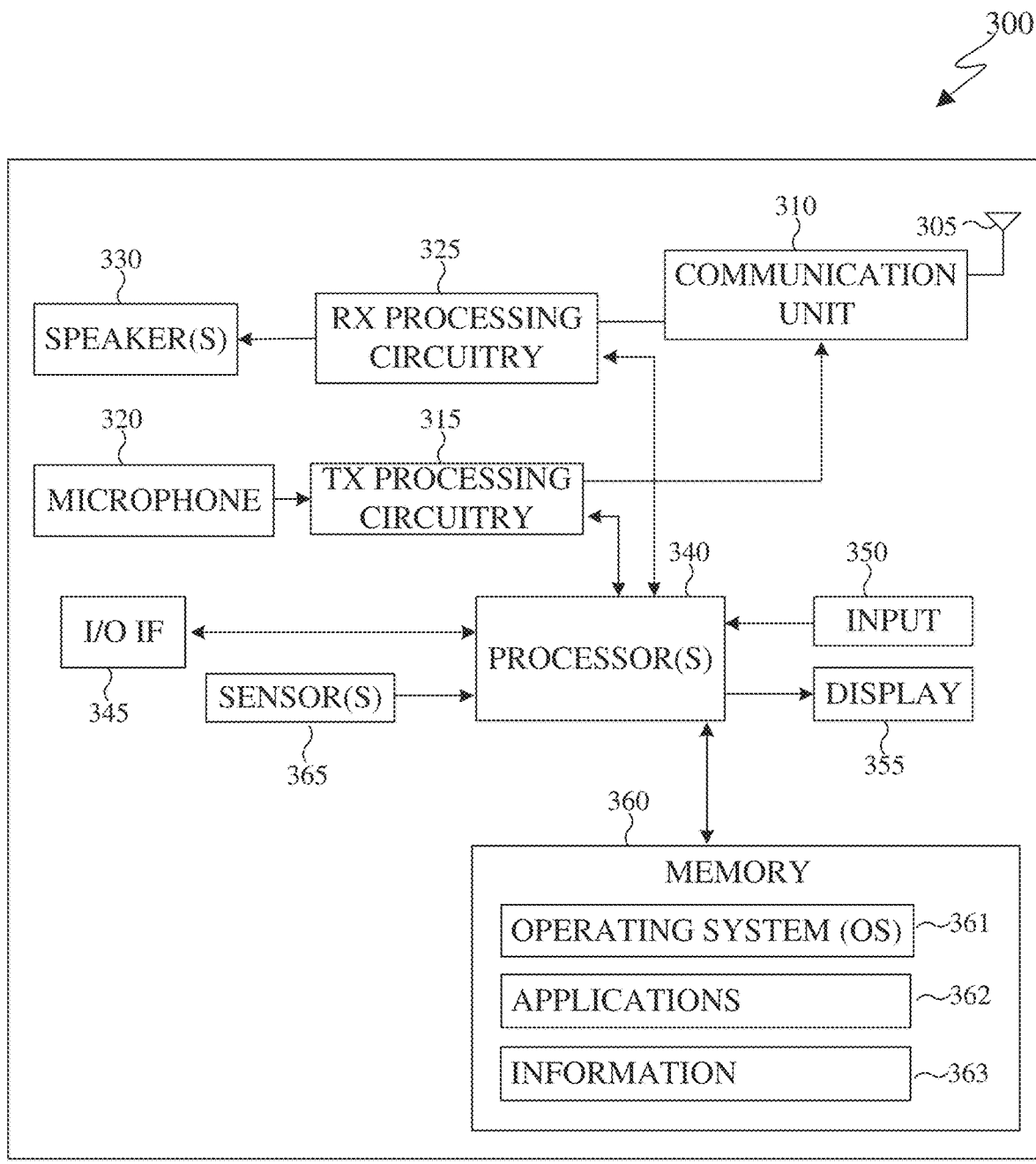
FIG. 3 illustrates another example electronic device in accordance with an embodiment of this disclosure.

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more local servers, one or more remote servers, clustered computers and components that act as a single pool of seamless resources, a cloud-based server, and the like. The server 200 can be accessed by one or more of the client devices 106-114 of FIG. 1.

As shown in FIG. 2, the server 200 includes a bus system 205 that supports communication between at least one processor 210, at least one storage device 215, at least one communication interface 220, and at least one input/output (I/O) unit 225. The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a read only memory, hard drive, Flash memory, or optical disc.

The communication interface 220 supports communications with other systems or devices. For example, the communication interface 220 could include a network interface card or a wireless transceiver facilitating communications over the network 102. The communication interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an example electronic device 300, and the electronic device 300 could represent one or more of the client devices 106-114 in FIG. 1. For example, in some embodiments, the electronic device 300 implements or represents a virtual assistant device that can receive a natural language input such as a verbal utterance, derive meaning from the input, and performs an action based on the derived meaning. The electronic device 300 can be a mobile communication device, such as, a mobile station, a subscriber station, a wireless terminal, a user equipment, a desktop computer (similar to desktop computer 106 of FIG. 1), a portable electronic device (similar to the mobile device 108, PDA 110, laptop computer 112, or tablet computer 114 of FIG. 1), and the like.

As shown in FIG. 3, the electronic device 300 includes an antenna 305, a communication unit 310, transmit (TX) processing circuitry 315, a microphone 320, and receive (RX) processing circuitry 325. The communication unit 310 can include, for example, a radio frequency (RF) transceiver, a BLUETOOTH transceiver, a WI-FI transceiver, a ZIGBEE transceiver, an infrared transceiver, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361 one or more applications 362, as well as information 363.

The communication unit 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The communication unit 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in a memory 360, such as the OS 361 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive, store, and timely instruct by providing natural language processing and the like. The processor 340 can move data into or out of the memory 360 as required by an executing process. In some embodiments, the processor 340 is configured to execute a plurality of applications 362 based on the OS 361 or in response to signals received from external source(s) or an operator. Example, applications 362 can include a camera application (for still images and videos), a video phone call application, an email client, a social media client, an SMS messaging client, a virtual assistant, and the like. The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user to interact with electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with sensor(s) 365 and/or a camera by providing additional input to processor 340. In some embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc.

The memory 360 can also contain the information 363. The information 363 can include both user information and device information. The hybrid engine (discussed in detail with respect to FIGS. 4, 5, 6 and 7, below) utilizes information about both the user and the device when determining whether to use a local execution engine, an external execution engine, or a combination of both the local execution engine and the external execution engine. For example, a combination of both the local execution engine and the external execution engine includes using both the local execution engine and the external execution engine in parallel to process the request. In another example, a combination of both the local execution engine and the external execution engine includes sequentially using one execution engine then the other execution engine to process the request. Additionally, the hybrid engine can determine, based on the information about both the user and the device, to partially process a request on the local execution engine. The information 363 can include a virtual assistant usage model, a user usage model, application context, and device context. The virtual assistant usage model includes data for one or more groups that includes the user. The user may be assigned to a group based on biographical data, such as age, gender, language, current location, and the like. The virtual assistant usage model operates based on usage data that is particular to the user's group. The user usage model includes usage data that is particular to the user of the electronic device 300. For example, the user usage model can include dialogue patterns associated with the user, preferred applications (such as a subset of the applications 362), interests of the user, and the like. The application context can include information associated with the applications 362. For example, the application context can include a list of the installed application 362 on the electronic device 300. In another example, the application context can include a list of the applications 362 that are currently opened in the foreground of the electronic device 300. The application context also can include context information associated with the applications 362 that are currently opened in the foreground of the electronic device 300. The device context includes data associated with the electronic device 300. For example, device context can indicate the available processing power, the available memory, network availability, battery level of the electronic device 300. The data associated with the device context can be generated at or around the time of the request from the user.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope, gyro sensor, an accelerometer, or a combination thereof), an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, an iris sensor, a fingerprint sensor, and the like. The sensor 365 can further include control circuits for controlling any of the sensors included therein. Any of these sensor(s) 365 can be located within the electronic device 300.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
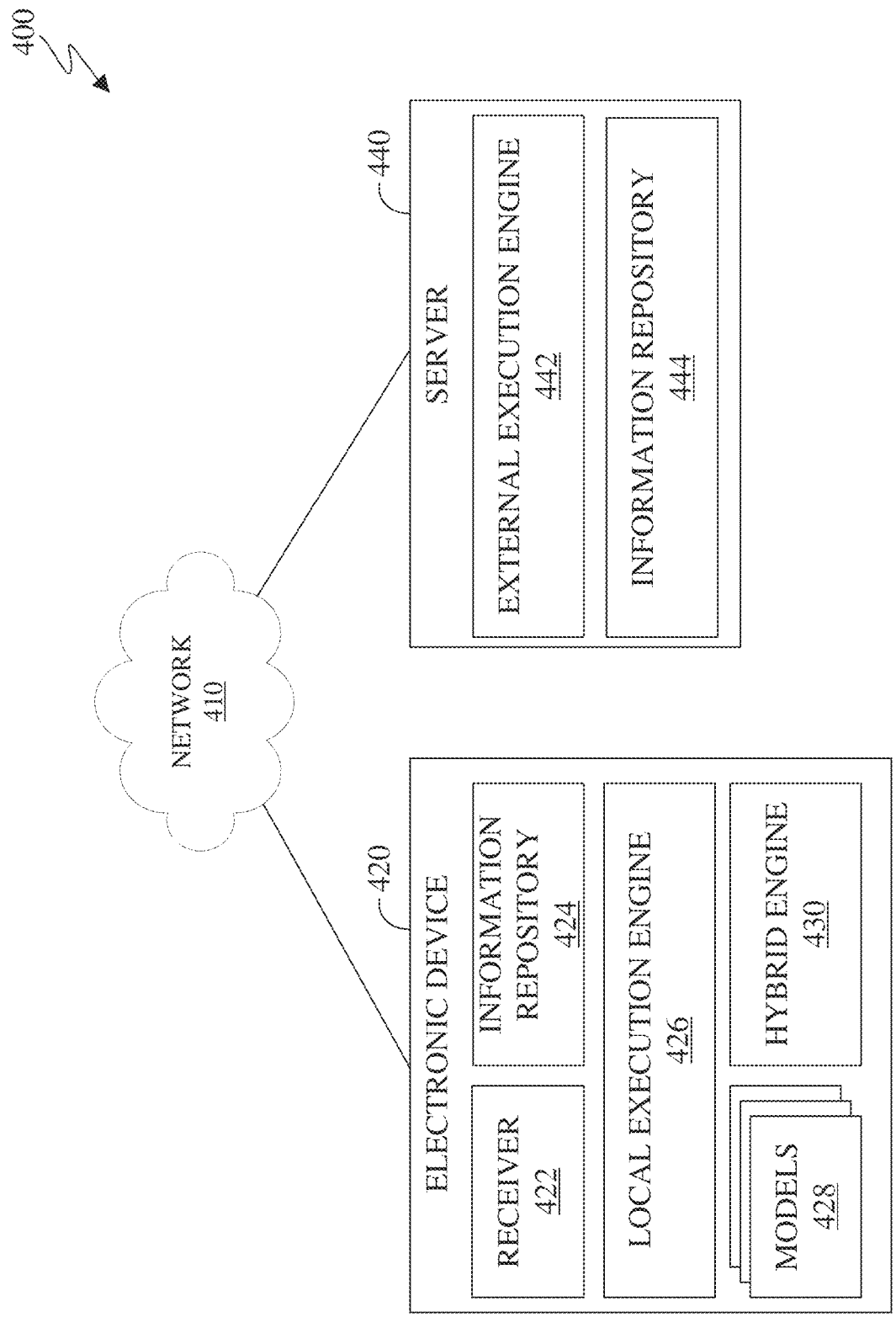
FIG. 4 illustrates an example environment architecture in accordance with an embodiment of this disclosure.

FIG. 4 illustrates an example environment architecture in accordance with an embodiment of this disclosure. As shown in FIG. 4, the environment architecture 400 includes an electronic device 420 and a server 440 in communication over a network 410.

The network 410 can be the same as or similar to the network 102 of FIG. 1. In some embodiments, the network 410 represents a "cloud" of computers interconnected by one or more networks, where the network is a computing system utilizing clustered computers and components that act as a single pool of seamless resources when accessed. Also, in some embodiments, the network 410 is connected with one or more servers (such as the server 104 of FIG. 1, the server 200 of FIG. 2, and/or the server 440), one or more electronic devices (such as the client devices 106-114 of FIG. 1, the electronic device 300 of FIG. 3, the electronic device 420, or a combination thereof). Further, in some embodiments, the network 410 can be connected to an information repository (external to that of the electronic device 420 and the server 440), such as a database, that contains look-up tables and information pertaining ASR, NLP, APE, and the like.

In some embodiments, the electronic device 420 can represent one of the client devices 106-114 of FIG. 1, the electronic device 300 of FIG. 3, a virtual assistant device, or other suitable device. In other embodiments, a portion of the components included in the electronic device 420 can be included in different devices, such as the server 440, multiple servers 104, 200, or 430, multiple electronic devices 106-114, 300, or 420, or other combinations of different devices.

In this example, the electronic device 420 includes a receiver 422, an information repository 424, a local execution engine 426, multiple models 428, and a hybrid engine 430. The electronic device 420 can receive a natural language input through the receiver 422. In some embodiments, the natural language input represents a received verbal utterance, a typed input, or the like. The received input can include a request from a user that instructs the electronic device 420 to perform a particular action or for another device to perform a particular action. The receiver 422 represents any suitable component for receiving a natural language input. For example, if the natural language input is a verbal utterance, the receiver can include the microphone 320 of FIG. 3. Example types of microphones that can be used here include a dynamic microphone, a condenser microphone, a piezoelectric microphone, or the like. The receiver 422 generally operates to receive sound waves (such as voice data) and convert the sound waves into electrical signals. The receiver 422 can also receive verbal utterances from another electronic device. For instance, the other electronic device can include a speaker, such as the speaker 330 of FIG. 3, which propagates verbal utterances. As another example, the receiver 422 can receive wired or wireless signals that include a natural language input, such as when the receiver 422 includes the communication unit 310 of FIG. 3. As yet another example, the receiver 422 can include an I/O interface (such as the I/O interface 345 of FIG. 3) connected to a keyboard that receives typed inputs from a user.

The information repository 424 represents any suitable structure(s) capable of storing and facilitating retrieval of information (such as data, program code, or other suitable information on a temporary or permanent basis). The information repository 424 can include a memory and a persistent storage. The memory can be RAM or any other suitable volatile or non-volatile storage device(s), while the persistent storage can contain one or more components or devices supporting longer-term storage of data, such as a ROM, hard drive, Flash memory, or optical disc. In certain embodiments, the information repository 424 includes a user profile, such as the location of the user, as well as the age and gender of the user.

In certain embodiments, the information repository 424 includes information, similar to the information 363 of FIG. 3. For example, the information repository 424 can include information associated with the models 428. As discussed in detail below, the models 428 include a virtual assistant usage model, a user usage model, application context, or device context or any combination thereof. The information included in the information repository 424 enables each of the models 428 to generate an individual confidence level. The hybrid engine 430 uses the confidence level to determine whether the local execution engine 426 or an external execution engine 442, associated with the server 440, processes a received request from a user.

For example, the information associated with the model 428 corresponding to the virtual assistant usage model (VUM) includes data of one or more groups that the user is associated with or included within. The groups can be based on biographical data, such as age, gender, language, current location, preferred applications, and the like. The data for the groups can include domain features (e.g., keywords, utterance length, etc.), grammar patterns (e.g., verbs, concept extraction, entity extraction, etc.), frequently used domains by people similar to the user (e.g., dialog context from previous requests, etc.), confidence value of a domain from the local execution engine, aggregated overall confidence level of past requests, or other similar types of data. For example, if the user of the electronic device 420 is a new user, the data that is available about the user primarily stems from any information acquired when the user signs up, such as when creating a new user account. As discussed in greater detail below, the VUM can assign the user to one or more groups based on the biographical data, interests, and location data provided during the initial setup. The groups associated with the user can change as more information is acquired about the user. As the groups change, the information associated with the VUM changes accordingly.

In another example, the information associated with the model 428 corresponding to user usage model (UUM) includes data associated with the user. While the information associated with the VUM represents data of one or more groups of users to which the user is related, the information UUM is specific to the user of the electronic device. For example, the information associated with UUM is specific to a user of the electronic device 420 and can include domain features (e.g., keywords, utterance length, etc.), grammar patterns (e.g., verbs, concept extraction, entity extraction, etc.), frequently used domains by the user (e.g., dialog context from previous requests, etc.), confidence value of a domain from the local execution engine, aggregated overall confidence level of past requests, or other similar types of data.

In certain embodiments, VUM, and UUM include dialog content and usage patterns of the user. The dialog content can be used to predict the domain of a request and a confidence level of the local execution engine 426 or the external execution engine 442 of handling the request. For example, VUM can use the dialogue context of a previous request to predict the domain to which a new request corresponds. The usage patterns can also be used to predict the domain of a request and a confidence level of the local execution engine 426 or the external execution engine 442 of handling the request. For example, user patterns include domain features and grammar patterns that are commonly used by the user. When a new request is received, the VUM and the UUM extract the patterns from the request and predict the domain and intent of the new request.

In yet another example, the information associated with the model 428 corresponding to application context (AC) includes data associated with the applications on the electronic device 420. The applications can be similar to the applications 362 of FIG. 3. The information associated with AC can include lists of available applications installed on the electronic device 420. The information associated with AC can include lists of available applications accessible by the electronic device 420. The information associated with AC can include lists of applications in the foreground of the application. In certain embodiments, applications in the foreground represent applications that are currently running on the electronic device 420.

In another example, the information associated with the model 428 corresponding to device context (DC) includes data associated with the electronic device 420. For example, if the electronic device 420 is battery powered, the information can include the current or remaining battery level. The information can include available memory, and processing capabilities of the electronic device 420. The information can include the current geographical location of the electronic device 420. The information also can include whether the electronic device 420 can currently communicate with the server 440, such as over the network 410. In certain embodiments, the information associated with DC is maintained in a log. In certain embodiments, the information associated with DC is gathered when an input request is received. By gathering the information when an input request is received, the model 428 associated with DC can access current and up-to-date information.

The local execution engine 426 includes an ASR engine, a NLP engine, and an APE engine. The local execution engine 426 can be referred to as an embedded engine as it is located within the electronic device 420. In certain embodiments, the local execution engine 426 is less powerful than the external execution engine 442, due to processing limitations and memory limitations of the electronic device 420, compared to a sever or a network of multiple computers and mainframes.

When a request is received from the receiver 422, the local execution engine 426 uses the ASR engine to analyze the request. If the request is a voice command, and if requested by the hybrid engine 430, the ASR engine identifies words from the voice command. The ASR engine can generate a word graph that includes word hypotheses, with certain level of confidence associated with each word. The ASR engine can use the information, in the information repository 424, which is associated with the models 428 to improve the confidence levels by personalizing potential words choices to the user. For example, the information associated with the models 428 corresponding to the VUM and UUM can indicate to the ASR engine the age, language, accent, preferences of the user, and the like. The information provides the ASR engine with past history of the user in order to increase the accuracy of the ASR engine. In another example, the information associated with the models 428 corresponding to the AC can include a list of application and context information associated with the applications. The information associated with the AC enables the ASR engine to identify and improve its confidence as to whether the request includes a name associated with one of the applications.

The NLP engine can receive the request from the user, the results of the ASR engine, or both. The NLP engine extracts a meaningful representation of the words through natural language understanding, such as language models. For example, the NLP engine can extract key words from the text, grammar patterns from the text as well as concepts and domains. For example, if the request is "find hotels near me," the domain could be hotels, the intent of the request is to find, and the location is based on the geographic location of the electronic device 420. Using the information in the information repository 424, the NLP engine can understand the request from the user.

The APE engine receives the results of the NLP engine. The APE engine can determine how to perform the request and then generate instructions instructing the electronic device 420 to perform the request. For example, if the request was "find a hotel near me," the APE engine can instruct the electronic device 420 to open a hotel booking program or application (such as the booking application that is preferred by the user), look up the exact location of the electronic device 420, and input the necessary information into the booking application. If additional information is needed (such as the dates the user desires to stay at a hotel), the APE engine can indicate to the virtual assistant to request that the user provides the necessary information.

The models 428 include the VUM, the UUM, the DC and the AC. In certain embodiments, additional models are included while in other embodiments fewer models are included in the models 428. Each of the models 428 provides a confidence level to the hybrid engine 430. The confidence levels enable the hybrid engine 430 to determine whether the local execution engine 426 or the external execution engine 442, located on the server 440, is used perform the ASR, the NLP, and the APE. Each of the models 428 can access information that is included in the information repository 424 as well as status information associated with the electronic device 420.

The models 428 generate individual confidence levels. The confidence levels are based on a probability as to whether the local execution engine 426 or the external execution engine 442 performs the request. Equation (1) below illustrates one of the models 428 generating a confidence level. Equation (1) is merely an example and other similar equations can be used.

$$P(y=j \mid x) = \frac{e^{x^T w_j}}{\sum_{k=1}^{K} e^{x^T w_k}} \qquad (1)$$

Equation (1) illustrates one of the models 428 deriving a confidence level based on certain criteria, and a weight associated therewith, where 'x' represents the criteria and 'w' represents the weight. The variable j encompasses the set of possible architectures such as the local execution engine 426, the external execution engine 442, sequential, parallel, and partial. In certain embodiments, each of the models 428 can generate individual confidence levels as each of the models can use different criteria and apply different weights. The individual confidence levels indicate whether the local execution engine 426 or the external execution engine 442 performs the request. Thereafter, the hybrid engine 430 aggregates the individual confidence levels and determines which execution engine performs the request.

For example, the model 428 corresponding to the VUM can predict an execution engine to process a request from a user based on the one or more groups to which the user is associated. The VUM maintains user classification based on a profile of the user and preferences. The VUM uses Equation (1) to generate a confidence level indicating which execution engine (the local execution engine 426 or the external execution engine 442) performs the request based on a domain of the request. The variable $x^T$ corresponds to domain confidence and an intent confidence, while the variable $w_j$ can correspond to an embedded domain weight or an embedded intent weight. For example, the VUM creates a user classification based on user preferences and predicts which execution engine based on the usage data of the group with which the user is associated.

The model 428 corresponding to the UUM predicts an execution engine for a particular user. The UUM uses Equation (1) to generate a confidence level indicating which execution engine (the local execution engine 426 or the external execution engine 442) performs the request based on a domain of the request. Based on the usage of the user, the UUM predicts the domain the request belongs to and generates a confidence level indicating which execution engine performs the request. For example, the UUM can predict the domain of the request based on past user usage and a confidence level indicating whether the local or external execution engines and process the request.

Similarly, the model 428 corresponding to AC predicts an execution engine for a particular user. The AC uses Equation (1) to generate a confidence level indicating which execution engine (the local execution engine 426 or the external execution engine 442) performs the request based on a domain of the request. For example, based on the list of applications on the electronic device 420, the AC can predict whether the electronic device is able to understand and process the request. For example, based on type of the request, the type of applications in the foreground and the applications installed on the electronic device 420, the AC can generate a confidence level associated with which execution engine (local or external) should process the request.

The model 428 corresponding to DC also predicts an execution engine for a particular user, based on the status of the electronic device. The DC uses Equation (1) to generate a confidence level indicating which execution engine (the local execution engine 426 or the external execution engine 442) performs the request based on aspects of the device itself. For example, if the device is unable to communicate with the server 440, then a confidence level is generated indicating that the processing cannot occur on the external execution engine 442. Criteria such as the battery level, the memory, the processing power, and the like assist the model 428 to predict which execution engine performs the request. For example, if the battery of the device is below a certain level, the confidence level can suggest that the processing is to be performed externally in order to preserve the battery of the electronic device 420.

In certain embodiments, in addition to the models 428 individually determining whether to process the request on the local execution engine 426 or the external execution engine 442, the confidence levels provided by the models 428 enable the hybrid engine 430 to determine whether the request should be processed in parallel or sequentially.

The hybrid engine 430 aggregates the confidence levels generated by the models 428 and determines for each level of processing whether to use the local execution engine 426 or the external execution engine 442. Equation (2) below illustrates an example equation aggregating the confidence levels of the four models 428.

$$P(Y_i) = \frac{(P_{UUM}(Y_i) * W_{UUM} + P_{VUM}(Y_i) * W_{VUM} + P_{DC}(Y_i) * W_{DC} + P_{AC}(Y_i) * W_{AC})}{(W_{UUM} + W_{VUM} + W_{DC} + W_{AC})} \quad (2)$$

Equation 2 describes the hybrid engine aggregating and normalizing the confidence levels from each of the models 428. The variable "P" corresponds to the confidence level from the UUM, VUM, DC and AC models 428. The variable "W" corresponds to a weight factor that is applied to each of the confidence levels. The variable "Y" corresponds to the different methods of processing the request such as using the local execution engine 426, the external execution engine 442, using the local execution engine 426 and the external execution engine 442 in parallel, sequentially using the local execution engine 426 and the external execution engine 442, and partially using either the local execution engine 426 or the external execution engine 442.

For each processing level, such as the ASR level, the NLP level, and the APE level, the hybrid engine 430 uses Equation (2) to select either the local execution engine 426 or the external execution engine 442 to perform the request, according to the current situation of the electronic device 420.

When processing a request at the ASR level the hybrid engine 430 determines whether the processing is performed on the local execution engine 426 or the external execution engine 442. The hybrid engine 430 can utilize one or more rules to determine which execution engine for processing the request. In certain embodiments, the rules can be predefined, learned over a period of time or both. The rules provide guidance for the hybrid engine 430 to determine which execution engine processes the request. For example, the rules can include sending the first few frames of the request to local execution engine 426 enabling a word recognition confidence level of those frames to be measured. In certain embodiments, if the request is audio known noise removal and then signal to noise ratio (SNR) of the request is measured. Based on user's previous domain and dialog context, the hybrid engine 430 predicts the probability of a domain to which the new request belongs and the confidence of the local execution engine in handling that domain. The hybrid engine 430 can determine an execution engine based on the confidence levels of the models 428 with respect to whether the local execution engine 426 understand follow-up in cases such as dictation for longer utterances. Another rule can require the hybrid engine 430 to check the network connection, determine whether a Network or Network connection exists (such as No Network), low network condition, or a strong network connection. Another rule can have a response lag time limit. For example, if there is no response from external execution engine 442 for specified duration, the hybrid engine 430 sends the request to the local execution engine 426. Another rule includes the aggregated confidence score of embedded ASR from the models 428.

The hybrid engine 430 can be based on Equation (3), Equation (4), and Equation (5) when choosing between the local execution engine 426 and the external execution engine 442. It should be noted that the equations are merely illustrative examples and other similar equations may be utilized.

$$P(\text{ASR\_Engine} = \text{Embedded}) \propto e\text{ASR\_confidence}(\text{domain} = Dx \mid \text{context} = Cx) \;\&\; (SNR) \;\& \quad (3)$$
$$e\text{ASR\_confidence}(\text{intent} = Ix \mid \text{context} = Cx)$$
$$e\text{ASR\_confidence}(audioFrames = f1\text{-}5) \;\&\; \text{Battery} \;\&\; CPU$$
$$\&\; \text{Network}^{-1} \;\&\; \text{Memory}$$

$$P(\text{domain} = Dx \mid \text{context} = Cx) = \frac{P(Cx) * P(Cx \mid Dx)}{\sum_{i=0}^{n} P(Cx \mid Di)} \quad (4)$$

$$P(\text{intent} = Ix \mid \text{context} = Cx) = \frac{P(Cx) * P(Cx \mid Ix)}{\sum_{i=0}^{n} P(Cx \mid Ii)} \quad (5)$$

Equation (3) above portrays that to perform the ASR processing on the local execution engine 426 is proportional many factors. The factors include the confidence level of the local execution engine 426 with respect to the domain context, the signal to noise ratio, the confidence level of the local execution engine 426 with respect to the intent context, a confidence level that the local execution engine 426 can perform the request based on the local execution engine 426 receiving the first five frames of the audio request, as well as the battery level, the processing level, low or no network availability and available memory. It should be noted that other factors may be used to assist with determining whether to perform ASR processing on the local execution engine 426. Equation (4) depicts the confidence level associated with the domain context and Equation (5) depicts the confidence level associated with the intent context.

If the hybrid engine 430 determines that the local execution engine 426 performs the ASR, the hybrid engine 430 then determines whether the NLP level processing is performed on the local execution engine 426 or the external execution engine 442. The hybrid engine 430 can utilize one or more rules to determine which execution engine performs the NLP. For example, based on the length of the request, the hybrid engine 430 can determine whether the local execution engine 426 can perform the NLP. In another example, based on the domain features in the request the hybrid engine 430 can determine whether the local execution engine 426 can perform the NLP. The hybrid engine 430 can determine an execution engine for NLP based on the confidence levels from the models 428. Another rule can require the hybrid engine 430 to check the network connection, determine whether there is no Network, low network condition, or a strong network connection.

The hybrid engine 430 can use Equation (6), below, as well as Equation (4) and (5), above, when choosing between the local execution engine 426 and the external execution engine 442 for performing the NLP. It should be noted that the equations are merely illustrative examples and other similar equations may be utilized.

$$P(\text{NLP\_Engine=Embedded}) \propto e\text{NLP\_confidence}$$
$$(\text{domain}=Dx \mid \text{context}=Cx) \& e\text{NLP\_confidence}$$
$$(\text{intent}=Ix \mid \text{context}=Cx) e\text{NLP\_confidence}$$
$$(\text{utteranceLength}=l) \& e\text{NLP\_confidence}$$
$$(\text{domain}=Dx \mid \text{domainFeatures}=f)$$
$$\& \text{Battery} \& CPU \& \text{Network}^{-1} \& \text{Memory} \quad (6)$$

Equation (6) above portrays that to perform the NLP processing on the local execution engine 426 is proportional many factors. The factors include the confidence level of the local execution engine 426 with respect to the domain context, the confidence level of the local execution engine 426 with respect to the intent context, the confidence level of the local execution engine 426 with respect to the length of the request, the confidence level of the local execution engine 426 with respect to the domain features, as well as the battery level, the processing level, low or no network availability and available memory. It should be noted that other factors may be used to assist with determining whether to perform NLP processing on the local execution engine 426.

If the hybrid engine 430 determines that the local execution engine 426 performs the NLP, the hybrid engine 430 then determines whether the APE level processing is performed on the local execution engine 426 or the external execution engine 442. The hybrid engine 430 can utilize one or more rules to determine which execution engine performs the APE. The hybrid engine 430 can determine an execution engine for APE based on the confidence levels from the models 428. The hybrid engine 430 can determine an execution engine for APE based on the results from the NLP. The hybrid engine 430 can determine an execution engine for APE based on data condition re-planning and execution of action. The hybrid engine 430 can determine an execution engine for APE based on battery, processor, memory, network availability and the like.

The hybrid engine 430 can use Equation (7), below when choosing between the local execution engine 426 and the external execution engine 442 for performing the APE. It should be noted that the equation is merely an illustrative example and other similar equations may be utilized.

$$P(\text{APE\_Engine-Embedded}) \propto e\text{APE\_confidence}$$
$$(\text{domain}=Dx) \& P(\text{replan} \mid Dx)^{-1} \& P(\text{Domain integration}) \& \text{Battery} \& CPU \& \text{Network}^{-1} \& \text{Memory} \quad (7)$$

Equation (7) above illustrates that performing the APE processing on the local execution engine 426 is proportional many factors. The eAPE_confidence(domain=Dx) represents the confidence of achieving Action planning for domain Dx, which depends on whether the domain is device specific and if there is application integration for that domain. P(replan|Dx) represents the confidence level associated with the ability of the local execution engine 426 to request more information from the user, if such information is needed. For example, if the user provided request is "book a reservation at 7:00 pm at a restaurant," the user failed to provide the number of persons to be included in the reservation. Therefore, the execution engine, when performing APE, is unable to execute any action because some necessary information is missing. Therefore, the APE will provide instructions requesting the necessary information be provided from the user. Once the information is received, the execution engine needs to perform a re-plan with the previously supplied request and the supplemental information. The hybrid engine 430 decides based on the confidence level whether the local execution engine 426 is able to perform the re-plan. The factors also include the battery level, the processing level, low or no network availability and available memory. It should be noted that other factors may be used to assist with determining whether to perform APE processing on the local execution engine 426.

Figure 6A:
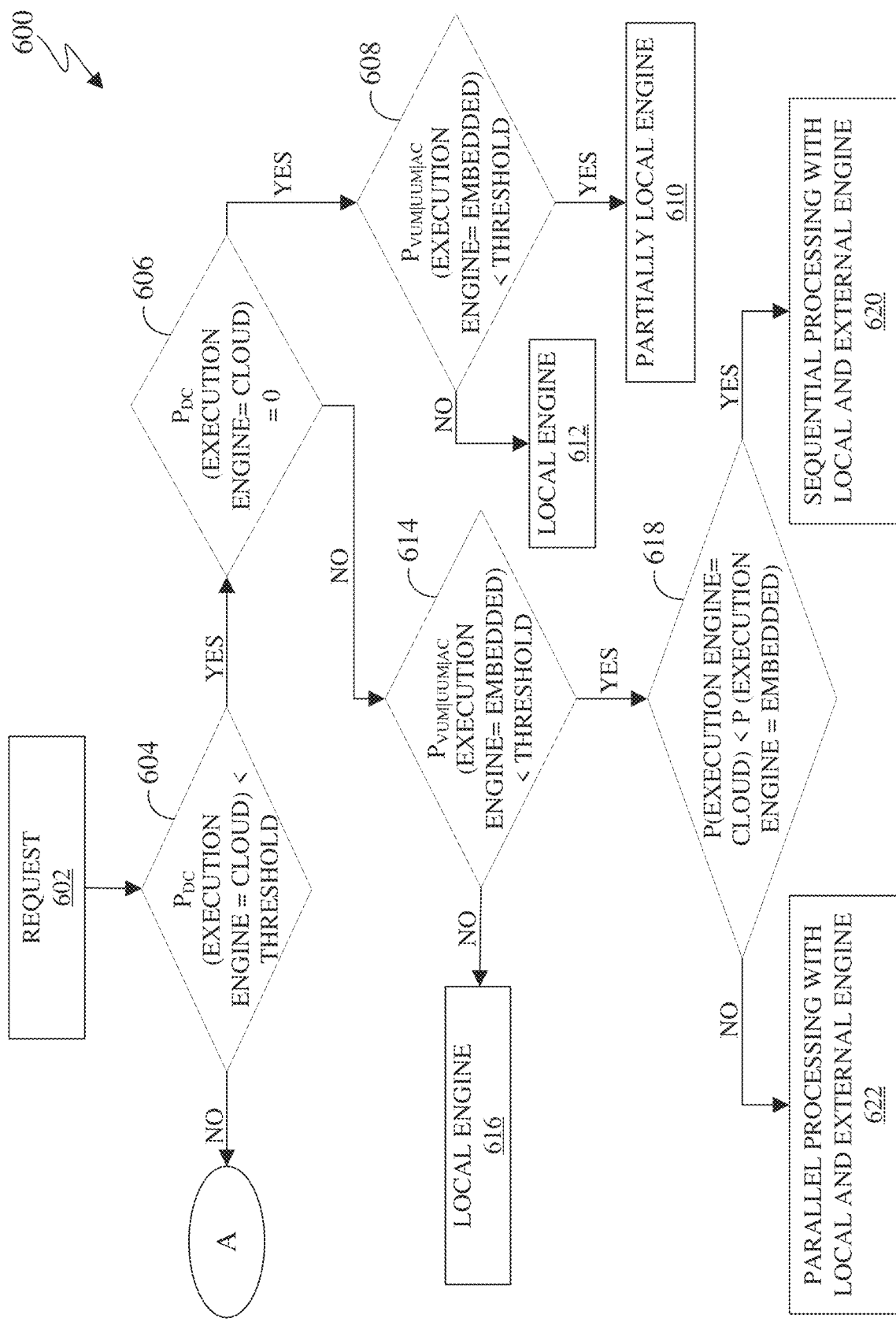
FIGS. 6A and 6B illustrate a process for determining how to process a request in accordance with an embodiment of this disclosure.
Figure 6B:
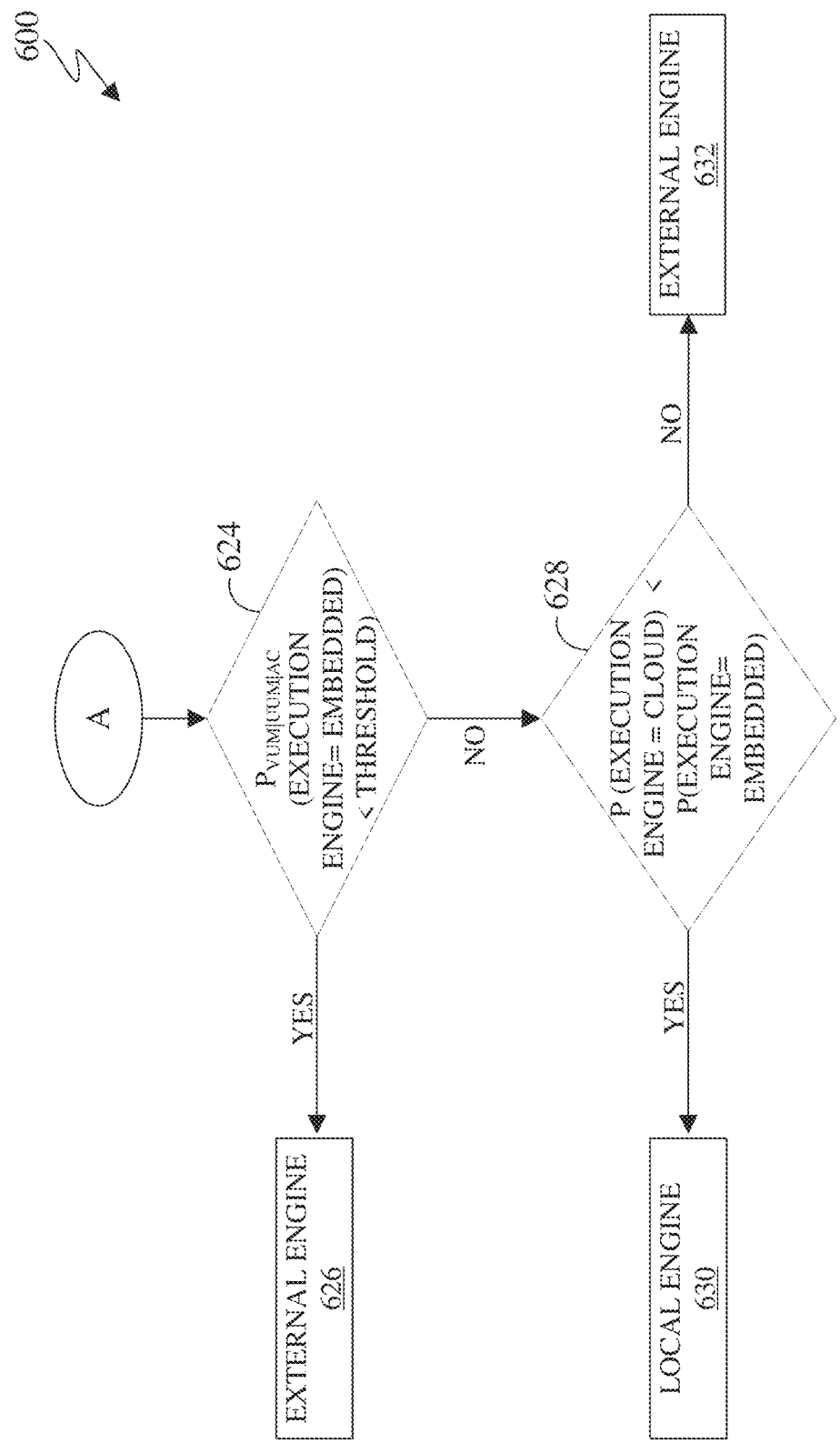

In certain embodiments, for each processing level (ASR, NLP, and APE) the hybrid engine 430 determines whether to process the request (i) on the local execution engine 426, (ii) on the external execution engine 442, (iii) sequentially, or (iv) in parallel. To sequentially process a request, the request is first sent to the local execution engine 426 and then the request is sent to the external execution engine 442. In another example, to sequentially process a request, a portion of the request is sent to the local execution engine 426 and then another portion of the request is sent to the external execution engine 442. To process the request in parallel, the request is sent to both the local execution engine 426 and the external execution engine 442 within a similar time period. In certain embodiments, the request is only partially processed on the local execution engine. For example, if the device is unable to determine a portion of the request with no network connectivity, the local execution engine 426 processes the portion of the request it understands. FIGS. 6A and 6B, below, describe how the hybrid engine 430 determines how to process the request.

In certain embodiments, the hybrid engine 430 is self-learning. After the local execution engine 426 or the external execution engine 442 finish processing the request or the request is interrupted the respective execution engine provides feedback data to hybrid engine 430 in order to improve future decisions. The request can be interrupted if a user provides an input to cancel the request, no internet connection, and the like. If the processing is performed on the local execution engine 426, the feedback data can indicate whether the battery was depleted beyond a threshold due to processing the request. If the processing is performed on the external execution engine 442, the feedback data can indicate whether latency, due to transmitting the request and receiving the results, exceeded a threshold. The user can also provide feedback data indicating whether the action performed was the intended action. In certain embodiments, the hybrid engine 430 alters the weight associated with the various confidence levels, based on a successful or unsuccessful result. Altering the weight associated with the various confidence levels can be based on a reward system, such that a weight is altered positively for a positive result and a weight is altered negatively for an undesirable result. In certain embodiments, the hybrid engine 430 can use back propagation when adjusting the weights. For example, the weight is adjusted by an integer of 1.0 at the APE level, the weight is adjusted by an integer of 0.5 at the NLP level, and the weight is adjusted by an integer of 0.25 at the ASR level. In another example, the reward can be 1.0 if the user did not cancel the request, or if there is no battery drainage (or battery drainage within a threshold). Whereas the reward can be −1.0 if the user canceled the request or if there was battery drainage beyond a threshold. Equations (8)-(11), below are used by the hybrid engine to derive errors and analyze the feedback data. It should be noted that the equations are merely illustrative examples and other similar equations may be utilized.

$$\delta(r, s, s') = (r + \gamma \operatorname{Argmax}_{\{a'\}} Q(s', a')) - Q(s, a) \qquad (8)$$

$$\operatorname{cost}(R, S, S', \theta) = \operatorname{sum}(\alpha * \delta(R, S, S', \theta)^{[2]}) \qquad (9)$$

$$W' = W + \left(-\frac{\partial \operatorname{cost}}{\partial w} * \alpha\right) \qquad (10)$$

$$(\theta = \{W\}) \qquad (11)$$

In Equation (8), δ is the Bellman error, r represents the reward, and s is the state of the execution engine, and a is the learning rate. The function $\operatorname{Argmax}_{\{a'\}} Q(s', a')$ is future reward. Equation (9) is a cost function that calculates the differences in expected prediction and the action prediction model. Equation (10) calculates new weights that are applied to Equation (2) to improve the decision of the hybrid engine 430 with respect to which execution engine to process the request.

In some embodiments, the server 440 can represent the server 104 of FIG. 1 or the server 200 of FIG. 2. In other embodiments, a portion of the components included in the server 440 can be included in different devices, such as multiple servers 104 or 200, multiple client devices 106-114, multiple electronic devices 300, or a combination of different devices. The server 440 can represent one or more local servers, one or more natural language processing servers, one or more speech recognition servers, one or more dynamic clustering servers, or the like. The server 440 can be a web server, a server computer such as a management server, or any other electronic computing system capable of sending and receiving data. The server 440 can include the external execution engine 442 and an information repository 444.

The external execution engine 442 includes an external ASR engine, an external NLP engine, and an external APE engine. The external execution engine 442 can be referred to as remote as it is remotely located from the electronic device 420. In certain embodiments, the external execution engine 442 is notified by the hybrid engine to perform ASR, NLP, or APE. In certain embodiments, the external execution engine 442 is more powerful than the local execution engine 426. The information repository 444 may be a superset of the information repository 424 on electronic device 420. The other information repository 444 may include data from other information repositories of other electronic devices. In certain embodiments, the information repository is located on a remote server external to the server 440.

Although FIG. 4 illustrates one example of an environment architecture 400, various changes can be made to FIG. 4. For example, any other suitable arrangement of the external execution engine 442 could be used in the environment architecture 400. For example, the external execution engine 442 can be located on multiple servers. In another example, any number of the models 428 can generate confidence levels indicating whether the hybrid engine 430 should use the local execution engine 426 or the external execution engine 442.

Figure 5:
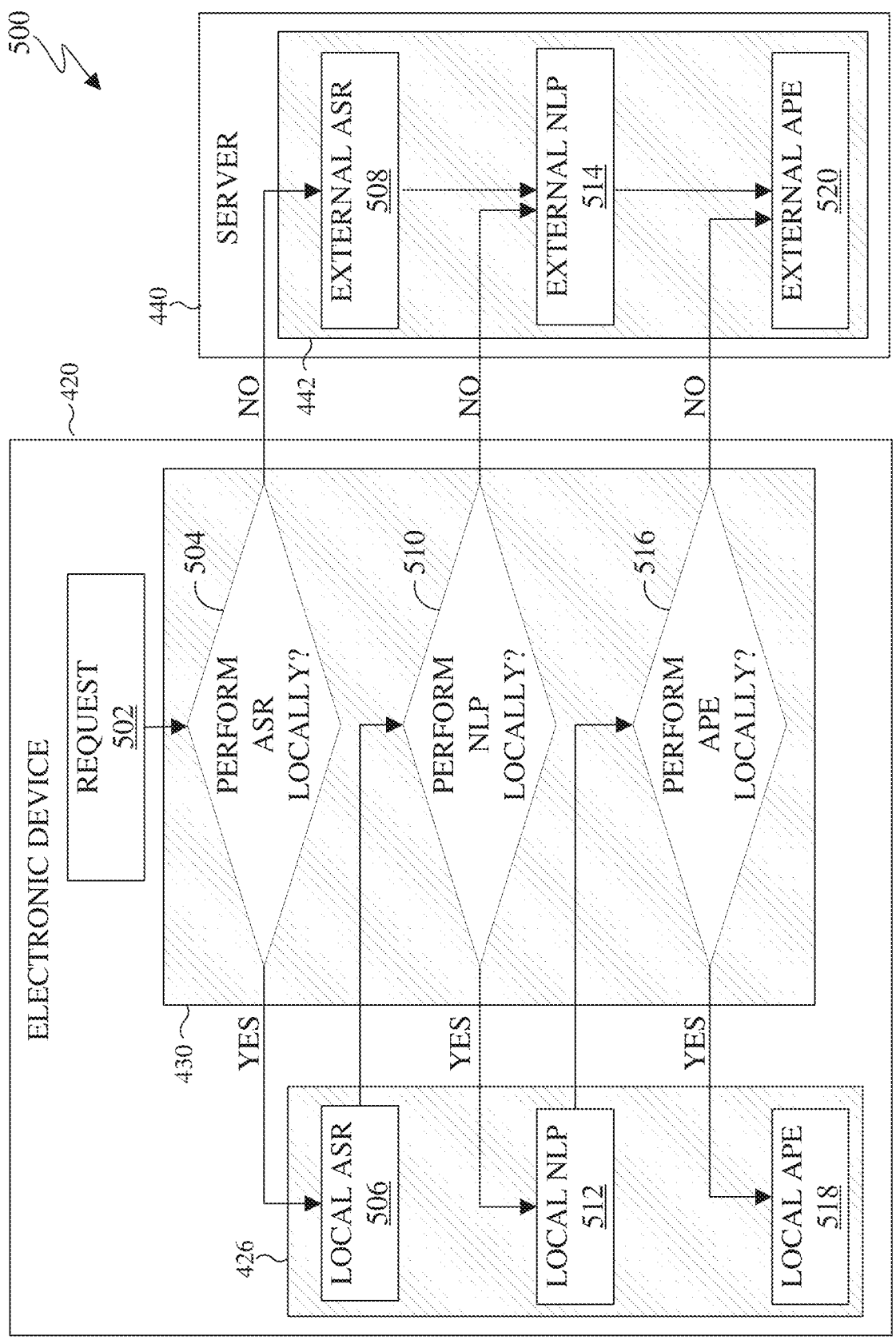
FIG. 5 illustrates a process for determining which execution engine is used to process a request in accordance with an embodiment of this disclosure.

FIG. 5 illustrates a process 500 for determining which execution engine is used to process a request in accordance with an embodiment of this disclosure. The process 500 here involves the electronic device 420 and the server 440 of FIG. 4. Other devices and components can be used.

The request 502 can be a verbal utterance, a typed input, or any other type of natural language input that a user directs to the electronic device 420 via the receiver 422 of FIG. 4. The hybrid engine 430 derives an aggregated predicted confidence level based on the confidence levels of the various models and determines whether to perform ASR locally at the local execution engine 426 or remotely on the external execution engine 442 (step 504). If the hybrid engine 430 determines to use the local ASR 506, the request is provided to the local execution engine 426 to perform the local ASR 506. When the processing at the local ASR 506 is complete, the results are provided back to the hybrid engine 430. Alternatively, if the hybrid engine 430 determines to use the external ASR 508, the request is provided to the external execution engine 442 to perform the external ASR 508. When the processing at the external ASR 508 is complete, the results are provided to the external NLP 514 instead of returning the results to the hybrid engine 430. Since the hybrid engine determined that the latency is increased when sending the request to that local execution engine 426 along with the execution latency of request on local execution engine 426 compared to external execution engine 442. Therefore, once the hybrid engine determines to use the external execution engine 442, the external execution engine 442 will perform the remainder of the processing associated with the request, to prevent latency from increasing.

In certain embodiments, the hybrid engine will send a portion of the request to the local ASR 506. The local ASR 506 will attempt to process the request and respond to the hybrid engine an indication as to its success or failure in attempting to process the request. For example, if the local ASR 506 is able to process the portion request the hybrid engine 430 can determine to send the entire request to the local ASR 506. If the local ASR 506 is unable to process the portion of the request, the hybrid engine will depend on the various confidence levels from the models 428, of FIG. 4, to derive the aggregated predicted confidence level and based on the aggregated predicted confidence level determine whether to use the local execution engine 426 or the external execution engine 442.

After the local ASR 506 performs the ASR processing, the results are provided back to the hybrid engine 430. Based on the results, the confidence levels associated with NLP via the models 428 and the rules associated with NLP processing, the hybrid engine 430 derives an aggregated predicted confidence level and determines whether to perform NLP locally at the local execution engine 426 or remotely on the external execution engine 442 (step 510). If the hybrid engine 430 determines to use the local NLP 512, the results of the local ASR 506 are provided to the local execution engine 426 to perform the local NLP 512. When the processing at the local NLP 512 is complete, the results are provided back to the hybrid engine 430. Alternatively, if the hybrid engine 430 determines to use the external NLP 514, the request is provided to the external execution engine 442 to perform the external NLP 514. When the processing at the external NLP 514 is complete, the results are provided to the external APE 520.

After the local NLP 512 performs the NLP processing, the results are provided back to the hybrid engine 430. Based on the results, the confidence levels associated with APE via the models 4218 and the rules associated with APE processing, the hybrid engine 430 derives an aggregated predicted confidence level and determines whether to perform APE locally at the local execution engine 426 or remotely on the external execution engine 442 (step 516). If the hybrid engine 430 determines to use the local APE 518, the results of the local NLP 512 are provided to the local execution engine 426 to perform the local APE 518. When the processing at the local APE 518 is complete, the local APE 518 generates instructions that instruct the electronic device 420 to perform an action included in the request. Alternatively, if the hybrid engine 430 determines to use the external APE 520, the request is provided to the external execution engine 442 to perform the external APE 520. When the processing at the external APE 520 is complete, the external APE 520 generates instructions that instruct the electronic device 420 to perform an action included in the request.

Although FIG. 5 illustrates one example for determining which execution engine use various changes can be made to FIG. 5. For example, any other suitable arrangement of the electronic device 420 and the server 440 can be used in the process 500.

FIGS. 6A and 6B illustrate a process 600 for determining how to process a request in accordance with an embodiment of this disclosure. The process 600 illustrates whether the request is to be processed by the local execution engine 426 of FIG. 4, the external execution engine 442 of FIG. 4, in parallel, in sequence or partially executed at the local execution engine 426. The process 600 may be performed by the server 104 or any of the client devices 106-114 of FIG. 1, the server 200 of FIG. 2, the electronic device 300 of FIG. 3, the electronic device 420 or the server 440 of FIG. 4, or any other suitable device or system. For ease of explanation, the process 600 is described as being performed by the hybrid engine 430 of FIG. 4.

The request 602 can be a verbal utterance, a typed input, or any other type of natural language input that a user directs to the electronic device 420 via the receiver 422 of FIG. 4. In block 604, the hybrid engine 430 determines whether the DC confidence level associated with the external execution engine 442 is less than a threshold. When the DC confidence is less than a threshold, the hybrid engine 430 determines, in block 606, whether the DC confidence level is zero. The DC confidence level is zero when there is no network connection, such that the electronic device 420 is unable to communicate with the server 440. When the DC confidence level is zero, the hybrid engine 430 determines, in block 608, whether the VUM confidence level, the UUM confidence level, and the AC confidence level of the local execution engine 426, when aggregated, is less than another threshold. When the aggregate of the VUM confidence level, the UUM confidence level, and the AC confidence is below the threshold, a portion of the request is performed at the local execution engine 426 in block 610. Alternatively, when the aggregate of the VUM confidence level, the UUM confidence level, and the AC confidence is above the threshold, the processing is performed fully on the local execution engine 426 in block 612.

At block 606, when the hybrid engine 430 determines the DC confidence level is not zero, such as when there is poor network connectivity, the hybrid engine 430 determines, in block 614, whether the VUM confidence level, the UUM confidence level, and the AC confidence level of the local execution engine 426, when aggregated, is less than another threshold. When the aggregate of the VUM confidence level, the UUM confidence level, and the AC confidence is above the threshold, the processing is performed fully on the local execution engine 426 in block 616. Alternatively, when the aggregate of the VUM confidence level, the UUM confidence level, and the AC confidence is above the threshold, the hybrid engine 430 determines, in block 618, whether the aggregated confidence level associated with the external execution engine 442 is less than the aggregated confidence level associated with the local execution engine 426. When aggregated confidence level associated with the external execution engine 442 is larger than the aggregated confidence level associated with the local execution engine 426, the processing is performed sequentially in block 620. When aggregated confidence level associated with the external execution engine 442 is smaller than the aggregated confidence level associated with the local execution engine 426, the processing is performed in parallel in block 622.

When, at block 604, the hybrid engine 430 determines the DC confidence level associated with the external execution engine 442 is greater than a threshold, the hybrid engine 430 determines, in block 624, whether the VUM confidence level, the UUM confidence level, and the AC confidence level of the local execution engine 426, when aggregated, is less than another threshold. When the aggregate of the VUM confidence level, the UUM confidence level, and the AC confidence is below the threshold, the processing is performed fully on the external execution engine 442 in block 626. When the aggregate of the VUM confidence level, the UUM confidence level, and the AC confidence is above the threshold, the hybrid engine 430 determines, in block 628, whether the aggregated confidence level associated with the external execution engine 442 is less than the aggregated confidence level associated with the local execution engine 426. When aggregated confidence level associated with the external execution engine 442 is smaller than the aggregated confidence level associated with the local execution engine 426, in block 630 the processing is performed fully on the local execution engine 426. When aggregated confidence level associated with the external execution engine 442 is larger than the aggregated confidence level associated with the local execution engine 426, the processing is performed fully on the external execution engine 442 in block 632.

Although FIGS. 6A and 6B illustrates one example of a process 600 for determining how to process a request, various changes may be made to FIGS. 6A and 6B. For example, while shown as a series of steps, various steps in FIGS. 6A and 6B could overlap, occur in parallel, or occur any number of times.

Figure 7:
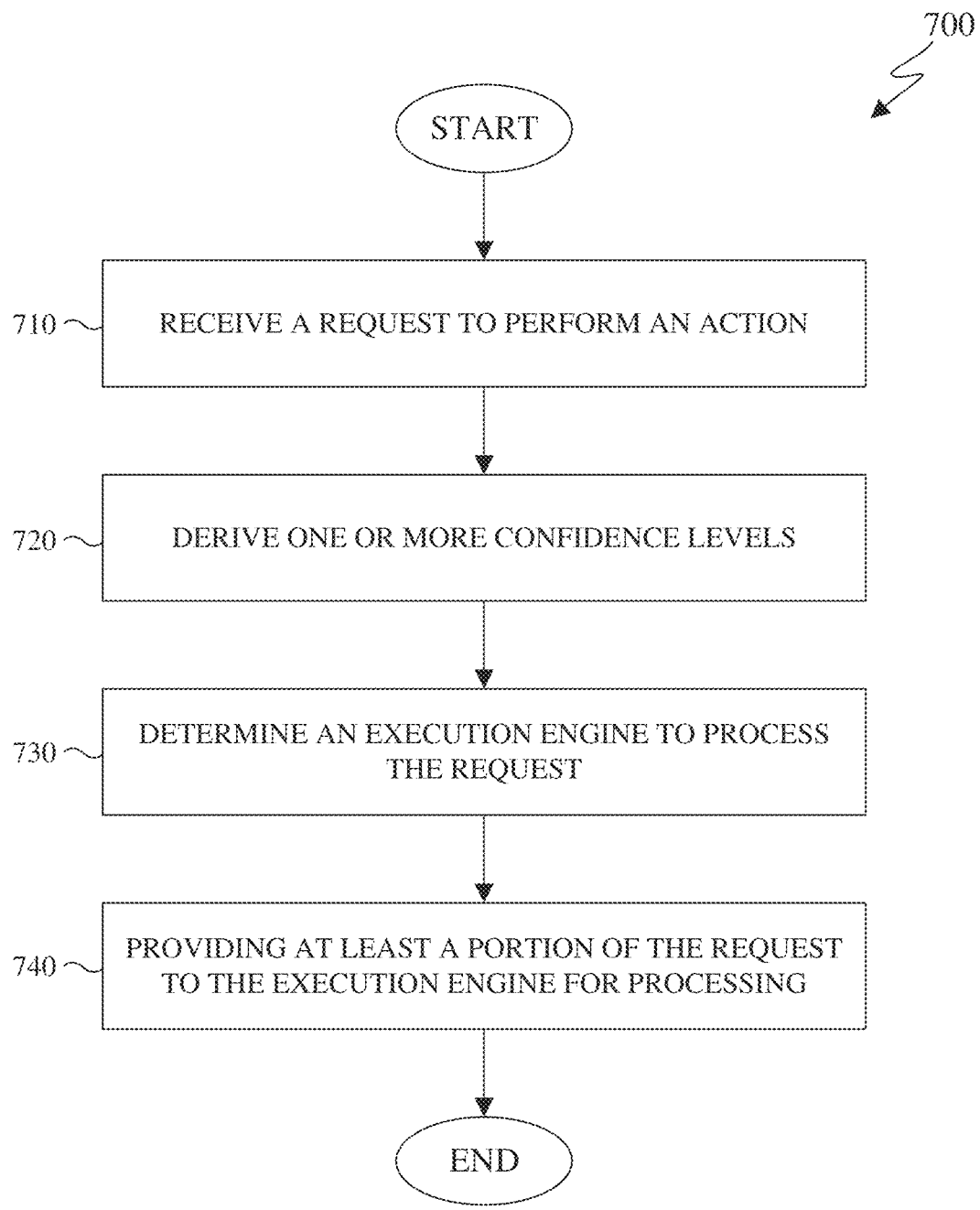
FIG. 7 illustrates an example method for providing a request to an execution engine in accordance with an embodiment of this disclosure.

FIG. 7 illustrates an example method 700 for providing a request to an execution engine in accordance with an embodiment of this disclosure. The method 700 may be performed by the server 104 or any of the client devices 106-114 of FIG. 1, the server 200 of FIG. 2, the electronic device 300 of FIG. 3, the electronic device 420 or the server 440 of FIG. 4A, or any other suitable device or system. For ease of explanation, the method 700 is described as being performed by the hybrid engine 430.

In block 710, the hybrid engine 430 receives a request to perform an action. The request can represent information associated with a received natural language input from a virtual assistant device.

In block 720, the hybrid engine 430 derives an aggregated predicted confidence level. The aggregated predicted confidence level is based on multiple confidence levels from one or more models. The models include a voice usage model, a user usage model, a device context and application context.

In block 730, the hybrid engine 430 determines an execution engine to process the request. The determination is based on the aggregated predicted confidence level. The execution engine is either a local execution engine, or an external execution engine. In certain embodiments, the hybrid engine 430 determines that the request is processed fully by the local execution engine. In certain embodiments, the hybrid engine 430 determines that the request is processed fully by the external execution engine. In certain embodiments, the hybrid engine 430 determines that the request is processed in parallel by both the local execution engine and the external execution engine. In certain embodiments, the hybrid engine 430 determines that the request is processed sequentially by one execution engine and then the other execution engine. In certain embodiments, the hybrid engine 430 determines that a portion of the request is processed by the local execution engine. In block 740, the hybrid engine 430 provides the request to the determined execution engine for processing.

Although FIG. 7 illustrates one example of a method 700 for providing a request to an execution engine, various changes may be made to FIG. 7. For example, while shown as a series of steps, various steps in FIG. 7 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method comprising:
   receiving, on an electronic device, a request to perform an action;
   deriving, by a processor of the electronic device, an aggregated predicted confidence level based on one or more confidence levels associated with information and context of the electronic device;
   determining, by the processor, an execution engine to process the request based on the aggregated predicted confidence level;
   providing at least a portion of the request to the execution engine for processing;
   in response to determining that the execution engine is not included in the electronic device, obtaining instructions indicating how to perform the action from the execution engine; and
   in response to determining that the execution engine is included in the electronic device, obtaining results from one of multiple processing levels of the execution engine.

2. The method of claim 1, wherein:
   determining the execution engine comprises determining whether to process the request on a local execution engine or an external execution engine based on the one or more confidence levels; and providing at least the portion of the request to the execution engine comprises one of:
  providing the request to the local execution engine;
  providing the request to the external execution engine;
  providing the request in parallel to the local execution engine and the external execution engine;
  providing the request to the local execution engine and then providing the request to the external execution engine; or
  when the external execution engine is unavailable, providing a first portion of the request to the local execution engine while not providing a second portion of the request to the local execution engine.

3. The method of claim 1, further comprising:
after the execution engine processes the request, receiving, from the execution engine, feedback data associated with processing the request; and
modifying the one or more confidence levels based on the feedback data.

4. The method of claim 1, wherein the execution engine comprises at least one of:
a local automatic speech recognition (ASR) engine;
an external ASR engine;
a local natural language processing (NLP) engine;
an external NLP engine;
a local action planning and execution (APE) engine; and
an external APE engine.

5. The method of claim 1, wherein:
the execution engine comprises a local automatic speech recognition (ASR engine and an external ASR engine; and
the method further comprises:
  providing a segment of the request to the local ASR engine;
  receiving, from the local ASR engine, a specified confidence level of the one or more confidence levels indicating whether the local ASR engine is able to process the request; and
  determining whether the execution engine to process the request is the local ASR engine, the external ASR engine, or both the local ASR engine and external ASR engine based on the specified confidence level, wherein the specified confidence level is based on the information and the context of the electronic device.

6. The method of claim 1, wherein:
the execution engine comprises a local automatic speech recognition (ASR) engine, an external ASR engine, a local natural language processing (NLP) engine, an external NLP engine, a local action planning and execution (APE) engine, and an external APE engine;
the local ASR engine and the external ASR engine represent a first level for processing the request, the first level configured to identify speech signals and convert the speech signals into text;
the local NLP engine and the external NLP engine represent a second level for processing the request, the second level configured to identify an intent of the request;
the local APE engine and the external APE engine represent a third level for processing the request, the third level configured to generate the instructions indicating how to perform the action with respect to the electronic device; and
the method further comprises altering the information for deriving the one or more confidence levels based on whether the execution engine corresponds to the first level, the second level, or the third level.

7. The method of claim 1, wherein:
the execution engine comprises a local automatic speech recognition (ASR) engine, an external ASR engine, a local natural language processing (NLP) engine, an external NLP engine, a local action planning and execution (APE) engine, and an external APE engine; and
the method further comprises:
  determining whether the execution engine to process the request is the local ASR engine or the external ASR engine based on a first confidence level of the one or more confidence levels, wherein the first confidence level is based on the information that is associated with automatic speech recognition;
  after determining that the execution engine to process the request is the local ASR engine, determining whether the execution engine to process local ASR results is the local NLP engine or the external NLP engine based on a second confidence level of the one or more confidence levels, wherein the second confidence level is based on the local ASR results and the information that is associated with natural language processing;
  after determining that the execution engine to process the local ASR results is the local NLP engine, determining whether the execution engine to process local NLP results is the local APE engine or the external APE engine based on a third confidence level of the one or more confidence levels, wherein the third confidence level is based on the local NLP results and the information that is associated with action planning and execution to perform the action included in the request; and
  receiving, from the local APE engine or the external APE engine, instructions indicating the action to perform.

8. An electronic device comprising:
at least one processor configured to:
  receive a request to perform an action with respect to the electronic device;
  derive an aggregated predicted confidence level based on one or more confidence levels associated with information and context of the electronic device;
  determine an execution engine to process the request based on the aggregated predicted confidence level;
  provide at least a portion of the request to the execution engine for processing;
  in response to a determination that the execution engine is not included in the electronic device, obtain instructions indicating how to perform the action from the execution engine; and
  in response to a determination that the execution engine is included in the electronic device, obtain results from one of multiple processing levels of the execution engine.

9. The electronic device of claim 8, wherein:
to determine the execution engine, the at least one processor is configured to determine whether to process the request on a local execution engine or an external execution engine based on the one or more confidence levels; and
to provide at least the portion of the request to the execution engine, the at least one processor is configured to one of:

provide the request to the local execution engine;
provide the request to the external execution engine;
provide the request in parallel to the local execution engine and the external execution engine;
provide the request to the local execution engine and then provide the request to the external execution engine; or
when the external execution engine is unavailable, provide a first portion of the request to the local execution engine while not providing a second portion of the request to the local execution engine.

10. The electronic device of claim 8, wherein the at least one processor is further configured to:
after the execution engine processes the request, receive, from the execution engine, feedback data associated with processing the request; and
modify the one or more confidence levels based on the feedback data.

11. The electronic device of claim 8, wherein the information comprises:
a user usage model;
a virtual assistant user usage model;
device context information; and
application context information.

12. The electronic device of claim 8, wherein the execution engine comprises at least one of:
a local automatic speech recognition (ASR) engine;
an external ASR engine;
a local natural language processing (NLP) engine;
an external NLP engine;
a local action planning and execution (APE) engine; and
an external APE engine.

13. The electronic device of claim 8, wherein:
the execution engine comprises a local automatic speech recognition (ASR engine and an external ASR engine; and
the at least one processor is further configured to:
provide a segment of the request to the local ASR engine;
receive, from the local ASR engine, a specified confidence level of the one or more confidence levels indicating whether the local ASR engine is able to process the request; and
determine whether the execution engine to process the request is the local ASR engine, the external ASR engine, or both the local ASR engine and external ASR engine based on the specified confidence level, wherein the specified confidence level is based on the information and the context of the electronic device.

14. The electronic device of claim 8, wherein:
the execution engine comprises a local automatic speech recognition (ASR) engine, an external ASR engine, a local natural language processing (NLP) engine, an external NLP engine, a local action planning and execution (APE) engine, and an external APE engine;
the local ASR engine and the external ASR engine represent a first level for processing the request, the first level configured to identify speech signals and convert the speech signals into text;
the local NLP engine and the external NLP engine represent a second level for processing the request, the second level configured to identify an intent of the request;
the local APE engine and the external APE engine represent a third level for processing the request, the third level configured to generate the instructions indicating how to perform the action with respect to the electronic device; and
the at least one processor is further configured to alter the information for deriving the one or more confidence levels based on whether the execution engine corresponds to the first level, the second level, or the third level.

15. The electronic device of claim 8, wherein:
the execution engine comprises a local automatic speech recognition (ASR) engine, an external ASR engine, a local natural language processing (NLP) engine, an external NLP engine, a local action planning and execution (APE) engine, and an external APE engine; and
the at least one processor is further configured to:
determine whether the execution engine to process the request is the local ASR engine or the external ASR engine based on a first confidence level of the one or more confidence levels, wherein the first confidence level is based on the information that is associated with automatic speech recognition;
after determining that the execution engine to process the request is the local ASR engine, determine whether the execution engine to process local ASR results is the local NLP engine or the external NLP engine based on a second confidence level of the one or more confidence levels, wherein the second confidence level is based on the local ASR results and the information that is associated with natural language processing;
after determining that the execution engine to process the local ASR results is the local NLP engine, determine whether the execution engine to process local NLP results is the local APE engine or the external APE engine based on a third confidence level of the one or more confidence levels, wherein the third confidence level is based on the local NLP results and the information that is associated with action planning and execution to perform the action included in the request; and
receive, from the local APE engine or the external APE engine, instructions indicating the action to perform.

16. The electronic device of claim 15, wherein the at least one processor is further configured to:
in response to determining that the execution engine to process the request is not the local ASR engine, provide the request to the external ASR engine;
in response to determining that the execution engine to process the request is the local ASR engine, provide the request to the local ASR engine;
after providing the request to the local ASR engine, receive, from the local ASR engine, the local ASR results;
in response to determining that the execution engine to process the local ASR results is not the local NLP engine, provide the local ASR results to the external NLP engine;
in response to determining that the execution engine to process the local ASR results is the local NLP engine, provide the local ASR results to the local NLP engine;
after providing the local ASR results to the local NLP engine, receive, from the local NLP engine, the local NLP results;

in response to determining the execution engine to process the local NLP results is the local APE engine, provide the local NLP results to the local APE engine; and in response to determining the execution engine to process the local NLP results is not the local APE engine, provide local NLP results to the external APE engine.

17. A non-transitory machine-readable medium containing instructions that when executed cause at least one processor of an electronic device to:
- receive a request to perform an action with respect to the electronic device;
- derive an aggregated predicted confidence level based on one or more confidence levels associated with information and context of the electronic device;
- determine an execution engine to process the request based on the aggregated predicted confidence level;
- provide at least a portion of the request to the execution engine for processing;
- in response to a determination that the execution engine is not included in the electronic device, obtain instructions indicating how to perform the action from the execution engine; and
- in response to a determination that the execution engine is included in the electronic device, obtain results from one of multiple processing levels of the execution engine.

18. The non-transitory machine-readable medium of claim 17, wherein the instructions when executed further cause the at least one processor to:
- after the execution engine processes the request, receive, from the execution engine, feedback data associated with processing the request; and
- modify the one or more confidence levels based on the feedback data.

19. The non-transitory machine-readable medium of claim 17, wherein the execution engine comprises at least one of:
- a local automatic speech recognition (ASR) engine;
- an external ASR engine;
- a local natural language processing (NLP) engine;
- an external NLP engine;
- a local action planning and execution (APE) engine; and
- an external APE engine.

20. The non-transitory machine-readable medium of claim 17, wherein:
- the execution engine comprises a local automatic speech recognition (ASR) engine, an external ASR engine, a local natural language processing (NLP) engine, an external NLP engine, a local action planning and execution (APE) engine, and an external APE engine;
- the local ASR engine and the external ASR engine represent a first level for processing the request, the first level configured to identify speech signals and convert the speech signals into text;
- the local NLP engine and the external NLP engine represent a second level for processing the request, the second level configured to identify an intent of the request;
- the local APE engine and the external APE engine represent a third level for processing the request, the third level configured to generate the instructions indicating how to perform the action with respect to the electronic device; and
- the instructions when executed further cause the at least one processor to alter the information for deriving the one or more confidence levels based on whether the execution engine corresponds to the first level, the second level, or the third level.

* * * * *